(12) United States Patent
Kim et al.

(10) Patent No.: US 10,185,533 B2
(45) Date of Patent: Jan. 22, 2019

(54) VIDEO WALL CONTROL SYSTEM AND METHOD

(71) Applicant: Hanwha Techwin Co., Ltd., Changwon-si (KR)

(72) Inventors: Dae Sang Kim, Changwon-si (KR); Young In Yun, Changwon-si (KR)

(73) Assignee: HANWHA AEROSPACE CO., LTD, Changwon-si (KR)

( * ) Notice: Subject to any disclaimer, the term of this patent is extended or adjusted under 35 U.S.C. 154(b) by 0 days.

(21) Appl. No.: 14/495,153

(22) Filed: Sep. 24, 2014

(65) Prior Publication Data
US 2015/0187324 A1 Jul. 2, 2015

(30) Foreign Application Priority Data
Dec. 26, 2013 (KR) .......................... 10-2013-0164157

(51) Int. Cl.
*G09G 5/00* (2006.01)
*G06F 3/14* (2006.01)
(Continued)

(52) U.S. Cl.
CPC ........... *G06F 3/1446* (2013.01); *H04N 7/181* (2013.01); *H04N 5/268* (2013.01)

(58) Field of Classification Search
CPC ............. G09G 5/003; G09G 2300/026; G02B 3/0006; G06F 3/1446; H04N 7/181; H04N 5/268
See application file for complete search history.

(56) References Cited

U.S. PATENT DOCUMENTS

| 2002/0116539 | A1 | 8/2002 | Bryczkowski et al. |
| 2003/0151562 | A1* | 8/2003 | Kulas .................... G06F 3/1446 345/1.1 |

(Continued)

FOREIGN PATENT DOCUMENTS

| CN | 101404746 A | 4/2009 |
| CN | 102196243 A | 9/2011 |

(Continued)

OTHER PUBLICATIONS

Communication dated May 18, 2017 by the State Intellectual Property Office of P.R. China in counterpart Chinese Patent Application No. 201410645063.2.

*Primary Examiner* — Temesghen Ghebretinsae
*Assistant Examiner* — Yaron Cohen
(74) *Attorney, Agent, or Firm* — Sughrue Mion, PLLC

(57) ABSTRACT

A video wall control system for controlling a video wall including a plurality of screens, the video wall control system including: at least one client module controlling the layout of the video wall; a central control module acquiring camera unique identification (UID) and a video stream from a monitoring system, storing the camera UID and the video stream, and controlling the layout of the video wall; a storage module storing the modified video wall layout; a gateway module receiving a layout modification event from the client module or the central control module and load the modified video wall layout from the storage module; and a decoding module loading the camera UID and the video stream from the central control module, receiving the modified video wall layout from the gateway module, and modifying the layout of the video wall based on the received modified video wall layout.

2 Claims, 6 Drawing Sheets

(51) Int. Cl.
*H04N 7/18* (2006.01)
*H04N 5/268* (2006.01)

(56) References Cited

U.S. PATENT DOCUMENTS

| | | | |
|---|---|---|---|
| 2003/0179156 A1* | 9/2003 | Willmore | G06Q 30/02 345/1.1 |
| 2003/0210209 A1 | 11/2003 | Lagarrigue et al. | |
| 2009/0059076 A1* | 3/2009 | Yu | H04N 5/268 348/584 |
| 2009/0109125 A1* | 4/2009 | Young | G06F 3/1446 345/1.3 |
| 2012/0098969 A1 | 4/2012 | Wengrovitz | |

FOREIGN PATENT DOCUMENTS

| | | |
|---|---|---|
| CN | 102208178 A | 10/2011 |
| CN | 102857738 A | 1/2013 |
| CN | 103198808 A | 7/2013 |
| KR | 10-2013-0010657 A | 1/2013 |

\* cited by examiner

VIDEO WALL CONTROL SYSTEM AND METHOD

CROSS-REFERENCE TO RELATED PATENT APPLICATION

This application claims priority from Korean Patent Application No. 10-2013-0164157 filed on Dec. 26, 2013 in the Korean Intellectual Property Office, the disclosure of which is incorporated herein in its entirety by reference.

BACKGROUND

1. Field

Apparatuses and methods consistent with exemplary embodiments of the inventive concept relate to a video wall control system, and more particularly, to a video wall control system which performs real-time monitoring and control closed circuit television (CCTV) images, split screens, and monitor merge/unmerge operations all together through a single control process by acquiring a considerable number of CCTV screens at the same time.

2. Description of the Related Art

Most buildings today are equipped with security systems and security personnel for monitoring the security systems. Video wall systems are systems that can be built in the security office in a building for allowing security personnel to properly monitor the security systems in the building and to immediately take measures in response to occurrence of certain situations. The term "video wall", as used herein, denotes an array of a plurality of monitors arranged on the same plane to operate as a large single screen.

For example, a video wall system may be built by combining multiple liquid crystal display (LCD) screens to provide a larger single screen, and may be configured to receive a variety of multimedia video signals from computers, internet protocol (IP) cameras, and CCTVs and display the received video signals on the larger single screen. Accordingly, an image can be enlarged and then displayed on an entire combined screen of the multiple LCD screens, and a user can easily identify the image from the combined screen even at a glance.

FIGS. 1A and 1B are diagrams of related-art video wall systems.

Referring to FIG. 1, a wall controller 11 transmits source input/output matrix information to an RGB matrix switch 15, and transmits monitor merge information to a video matrix 17. That is, the wall controller 11 transmits instructions to both the RGB matrix switch 15 and the video matrix 17 to perform a change of sources and merge/unmerge functions and thus to display an image on a video wall 5. For CCTV images, video sources 13 may need to be changed by using particular software, which is different from wall control software of the wall controller 11.

The video wall system of FIG. 1B, which has a similar structure to that of the video wall system of FIG. 1A, can be built more easily than the video wall system of FIG. 1A because video wall devices 18 and 19 are configured to communicate with each other through Transmission Control Protocol (TCP). However, in the video wall system of FIG. 1B, like in the video wall system of FIG. 1A, additional software, which is different from wall control software of a wall controller 11, may be needed to change video sources 13. That is, in the case of the related-art video wall systems of FIGS. 1A and 1B, control of each monitor (such as merge/unmerge), control of sources, and control of split CCTV screens are performed separately and individually.

Also, the related-art video wall systems of FIGS. 1A and 1B request instructions to be entered and processed for each control process, thereby causing inconvenience to users. Also, most software for controlling a CCTV screen is designed for use in user personal computers (PCs), and thus cannot be used to monitor people from a control center. Also, as the number of monitors employed in a video wall increases, the number of images that can be displayed by each monitor decreases. Also, in the related-art video wall systems of FIGS. 1A and 1B, the wall controller 11 and the matrix switcher 15 are both needed, thereby causing an increase in manufacturing cost. For this reason, some users may request multiple screens to be merged on a monitor-by-monitor basis without using the wall controller 11. Also, since multiple video walls cannot be controlled with a single personal computer (PC), monitor extensibility and freedom may deteriorate.

SUMMARY

Exemplary embodiments of the inventive concept provide a video wall control system and method, which can control closed circuit television (CCTV) images, split screens and monitor merge/unmerge operations all together through a single control process.

Exemplary embodiments of the inventive concept also provide a video wall control system and method, which can connect a maximum of 36 personal computers (PCs) (and a maximum of 144 monitors) and can secure a minimum of 25 channels for each monitor, unlike in the related art where only up to 4 monitors are connectable and controllable with a single PC.

Exemplary embodiments of the inventive concept also a video wall control system and method, which can allow multiple video walls to be controlled by a single PC.

However, these exemplary embodiments are not restricted to those set forth herein. The above and other exemplary embodiments will become more apparent to one of ordinary skill in the art to which the inventive concept pertains by referencing the detailed description of the exemplary embodiments given below.

According to an aspect of an exemplary embodiment, there is provided a video wall control system for controlling a video wall including a plurality of screens. The video wall control system may include: at least one client module configured to control the layout of the video wall; a central control module configured to acquire camera unique identification (UID) and a video stream from a monitoring system, stores the camera UID and the video stream, and control the layout of the video wall; a storage module configured to in response to the layout of the video wall being modified by the client module or the central control module, store the modified video wall layout; a gateway module configured to receive a layout modification event from the client module or the central control module and load the modified video wall layout from the storage module; and a decoding module configured to load the camera UID and the video stream from the central control module, receive the modified video wall layout from the gateway module, and modify the layout of the video wall based on the received modified video wall layout.

According to an aspect of another exemplary embodiment, there is provided a video wall control method which may include: in response to video control being initiated, loading camera UID and a video stream into a decoding module from a video streaming server of a central control module; in response to a layout of a video wall being modified by a client module or the central control module, storing the modified video wall layout; transmitting a layout modification event regarding the modified video wall layout from the client module or the central control module to a gateway module; in response to receipt of the layout modification event, loading the modified video wall layout on the gateway module from the storage module; and transmitting the loaded modified video wall layout from the gateway module to the decoding module.

According to the exemplary embodiments, it is possible to control CCTV images, split images and monitor merge/unmerge operations all together through a single control process and thus to improve convenience.

In addition, since a maximum of 36 monitors can be connected, it is possible to allow a video wall to be set freely and conveniently, and it is also possible to properly monitor multiple individuals from a control center.

Moreover, it is possible to acquire a considerable number of CCTV images and thus to provide a "sequence" function based on the acquired CCTV images. Also, it is possible to provide three different types of "spot" functions (such as wall, monitor and tile modes) for an immediate notification of any event occurred and thus to allow security personnel to properly install and set up a video wall in consideration of the characteristics of a place where the video wall needs to be provided. Also, it is possible to heighten the context awareness of users by precisely detecting any event occurred and notifying the users of the results of the detection.

Other features and exemplary embodiments will be apparent from the following detailed description, the drawings, and the claims.

BRIEF DESCRIPTION OF THE DRAWINGS

The above and other aspects of the exemplary embodiments will become more apparent with reference to the attached drawings, in which.

DETAILED DESCRIPTION OF THE EXEMPLARY EMBODIMENTS

The inventive concept will now be described more fully hereinafter with reference to the accompanying drawings, in which exemplary embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The same reference numbers indicate the same components throughout the specification.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Exemplary embodiments will hereinafter be described with reference to the accompanying drawings.

Figure 2:
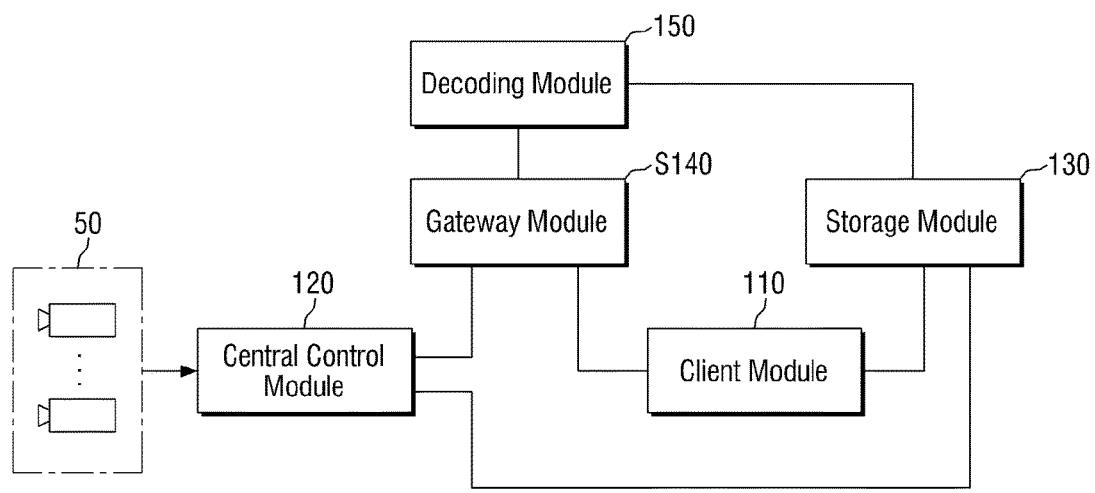
FIG. 2 is a block diagram of a video wall control system according to an exemplary embodiment.

FIG. 2 is a block diagram of a video wall control system according to an exemplary embodiment.

Figure 1A:
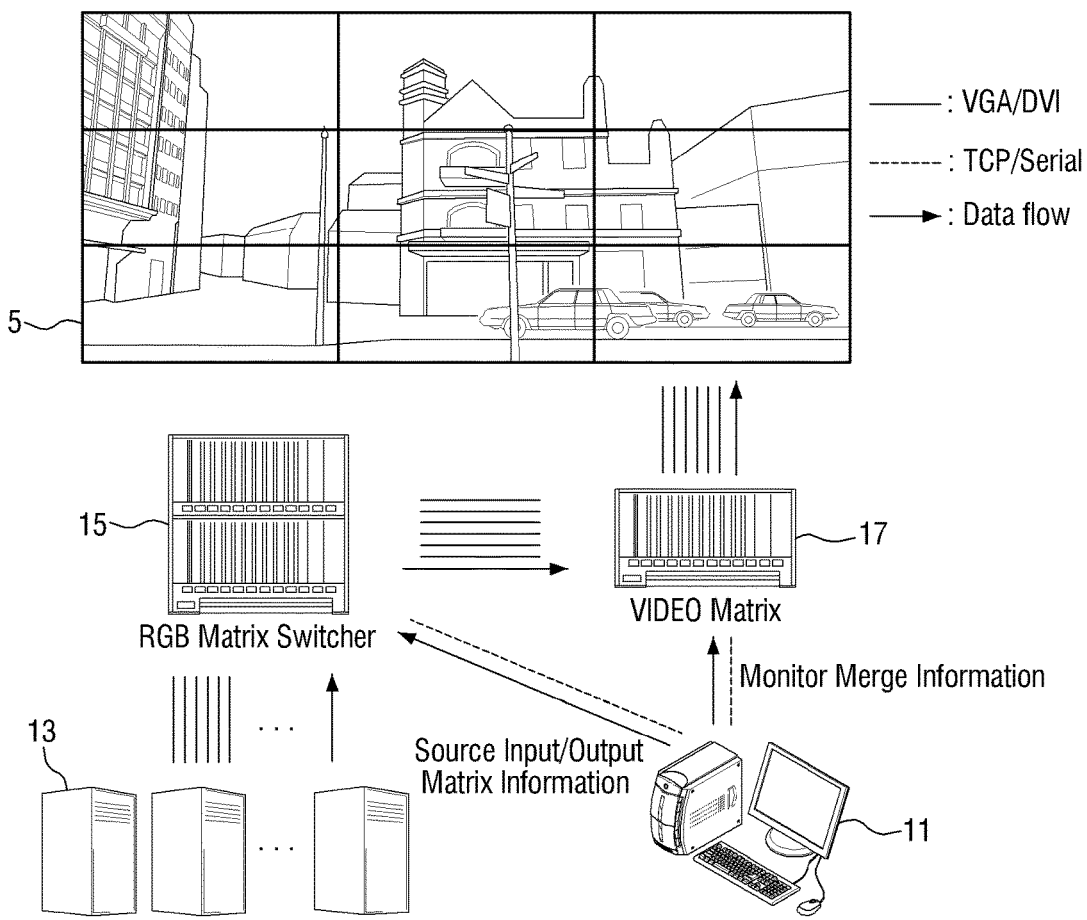
FIGS. 1A and 1B are diagrams of related-art video wall systems.
Figure 1B:
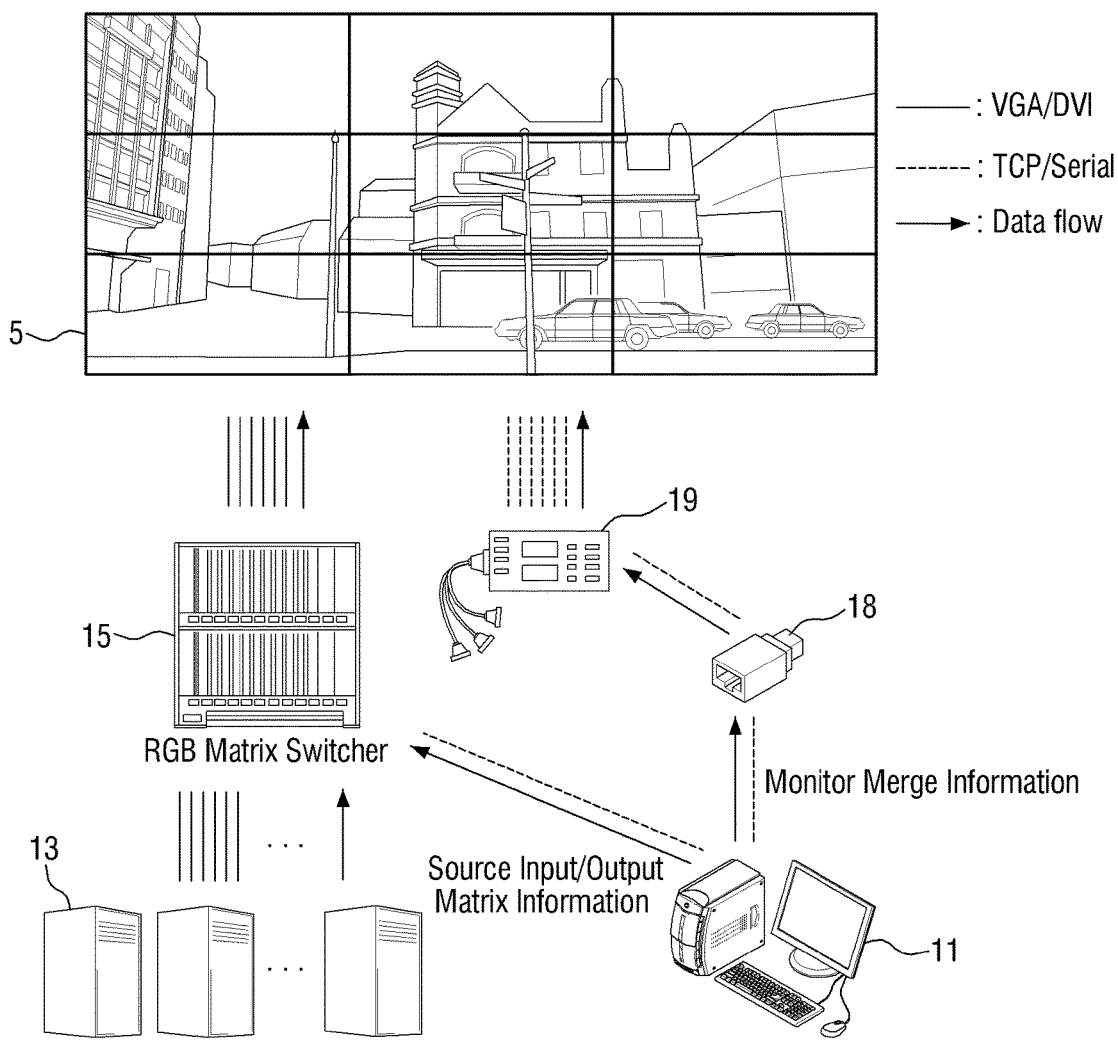

Referring to FIG. 2, a video wall control system includes at least one client module 110, a central control module 120, a storage module 130, a gateway module 140, and a decoding module 150. The client module controls a video wall 5 (as shown FIGS. 1A and 1B) including a matrix of a plurality of screens, and also controls a layout of the video wall 5. The central control module 120 acquires camera unique identification (UID) and a video stream from a monitoring system 50, and controls the layout of the video wall 5. In response to the layout of the video wall 5 being modified by the central control module 110, the storage module 130 stores the modified video wall layout. The gateway module 140 receives a layout modification event from the client module 110 or the central control module 120, and loads the modified video wall layout present in the storage module 130. The decoding module 150 receives the modified video wall layout from the gateway module 140 and changes the layout of the video wall 5 based on the received modified video wall layout. The layout of the video wall 5 may include a monitor layout in which each of the screens displays an image separately, and a wall layout in which the screens display an image together as if they were a single screen. The matrix of the screens forms the video wall 5. The monitor layout is a layout in which an image is displayed on one of the screens, and the wall layout is a layout in which an image is displayed on the entire matrix of the screens. The video wall control system may provide a multi-view function, which is the function of displaying multiple images on a single screen, and this type of layout will hereinafter be referred to as a tile layout. Since the video wall control system can provide three "spot" functions (such as wall, monitor and tile modes), the video wall control system can allow security personnel to properly install and set up the video wall 5 in consideration of the characteristics of a place where the video wall 5 needs to be provided, with the use of the "spot" functions. Also, it is possible to precisely detect any event occurred from the video wall 5 and notify users of the results of the detection. Accordingly, the context awareness of the users can be heightened.

The functions of the elements of the video wall control system will hereinafter be described.

Figure 3:
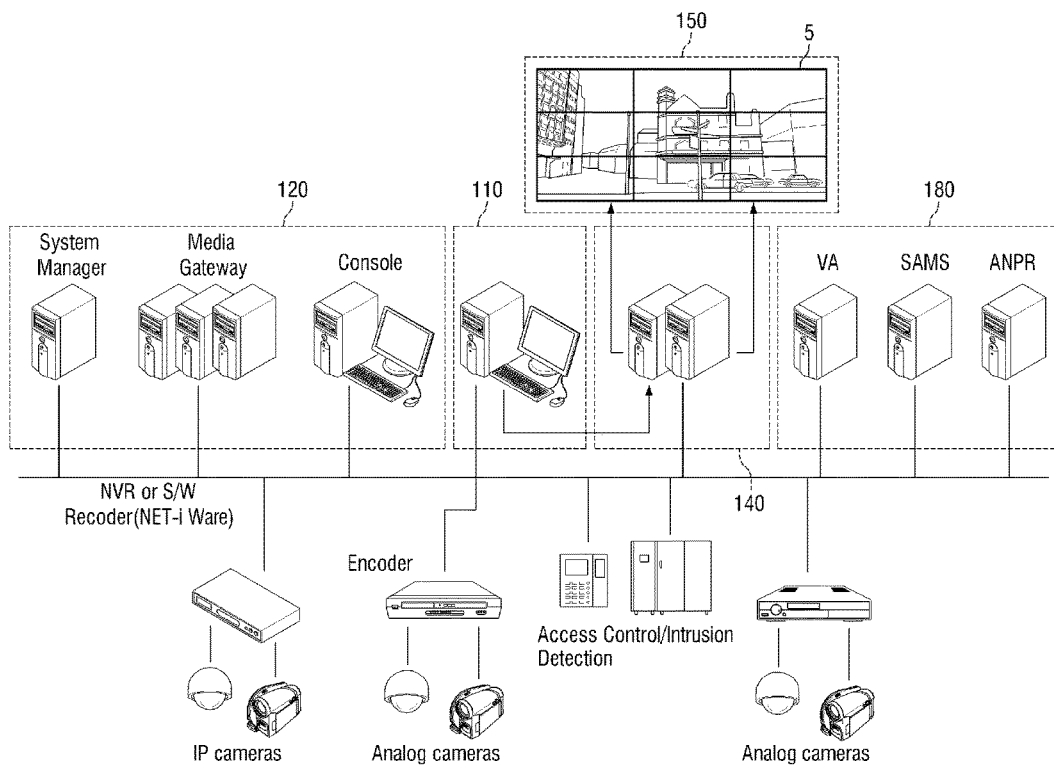
FIG. 3 is a diagram illustrating a configuration of a project that forms the matrix of the video wall control system illustrated in FIG. 2, according to an exemplary embodiment.
Figure 4:
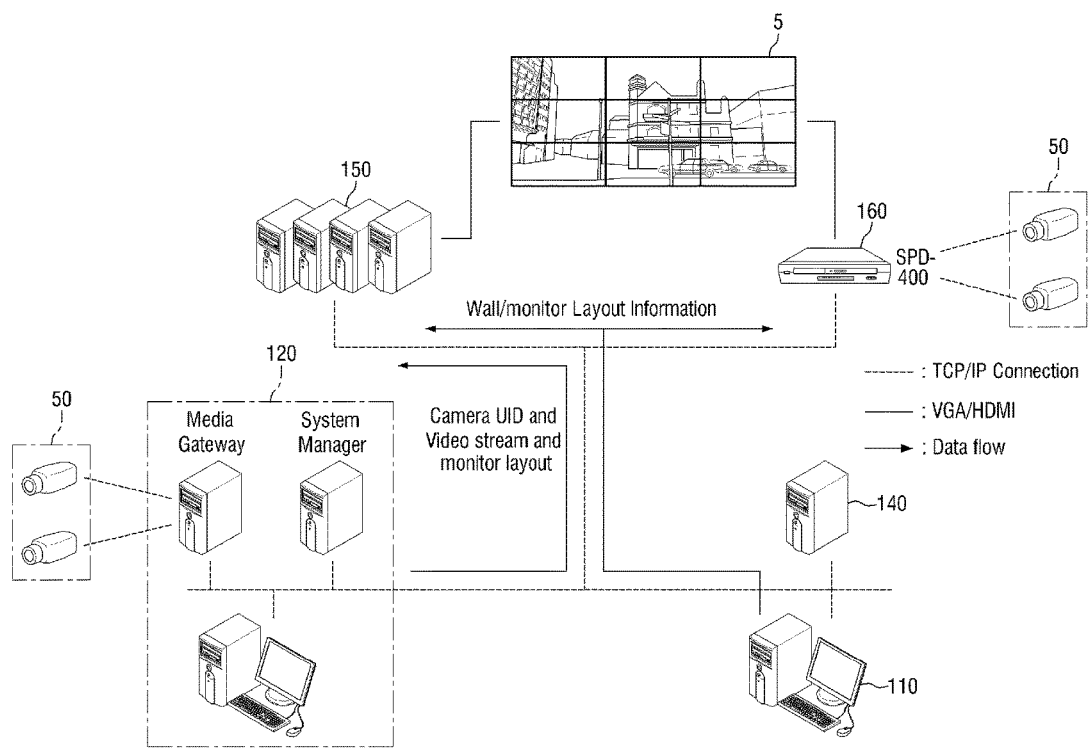
FIG. 4 is a diagram illustrating a structure of the video wall control system illustrated in FIG. 2, according to an exemplary embodiment.

FIG. 3 is a diagram illustrating a configuration of a project that forms the matrix of the video wall control system illustrated in FIG. 2, and FIG. 4 is a diagram illustrating a structure of the video wall control system illustrated in FIG. 2, according to exemplary embodiments.

Referring to FIG. 3, the client module 110 includes software used by an end user. The end user may use the software to control the video wall 5.

The central control module 120 includes management software for controlling various video monitoring products such as internet protocol (IP) cameras, analog cameras, encoders, digital video recorders (DVRs), network video recorders (NVRs), or software recorders with the use of a single platform. By using the management software, four monitors can be connected to a single personal computer (PC). The central control module 120 may include a system manager and a media gateway (i.e., a video streaming server), and may thus easily access other devices such as network cameras. As illustrated in FIG. 3, the video wall control system is configured to be able to interwork with the central control module 120, which can manage the video monitoring products on a single platform.

In response to the layout of the video wall 5 being modified by the client module 110 or the central control module 120, the storage module 130 stores the modified video wall layout. The modified video wall layout is provided to the decoding module 150 via the gateway module 140, and the client module 110 and the central control module 120 may control the decoding module 150 separately via the gateway module 140.

The gateway module 140 may allow the central control module 120 and the client module 110 to control the video wall 5 and the decoding module 150 at the same time. That is, the central control module 120 and the client module 110 may communicate with each other via the gateway module 140.

The decoding module 150, which performs functions of a decoder, may include software for decompressing compressed video information so as to be able to be displayed on a screen and thus to be recognizable. That is, the decoding module 150 may include software for controlling an image displayed on the video wall 5. The software of the decoding module 150 may allow a maximum of 36 PCs to interwork with the video wall 5 and may provide a minimum of 25 split video streams to each monitor. The decoding module 150 may be designed to be applicable to a variety of images and be interworkable with various events through communication with the gateway module 140.

A network video decoder 160 (such as SPD-400), like the decoding module 150, includes software for controlling an image displayed on the video wall 5, and performs decoding with the use of the software. The software included in the network video decoder 160 is designed to support a maximum of four (4) monitors and receive instructions through Ethernet and display an image desired by a user. That is, the network video decoder 160 may output an up to 4-channel stream that is to be transmitted to a network.

In the exemplary embodiments of FIGS. 1 to 4, the video wall control system can not only perform the functions of a related-art video wall control system, i.e., the functions of the central control module 120, the storage module 130, and the network video decoder 160, but also allow the client module 110, which enables an end user to control the video wall 5, to control the decoding module 150 and in the end, the video wall 5, via the gateway module 140. Accordingly, the video wall control system can interwork with a maximum of 36 PCs to support a maximum of 144 monitors, can allow each end user to set the video wall 5 easily and freely, can control split screens and monitor merge/unmerge functions, by which the individual screens of multiple monitors are merged into a larger single screen or the larger single screen is unmerged back into the individual screens of the multiple monitors, and can allow the video wall 5 to be controllable by multiple individuals in a control center. Also, in response to the number of monitors connected to the video wall 5 increasing, the video wall control system can increase the number of images that can be displayed by each of the monitors accordingly, and can support not only a change of images, but also image merge/unmerge operations and a change of sources.

Figure 5:
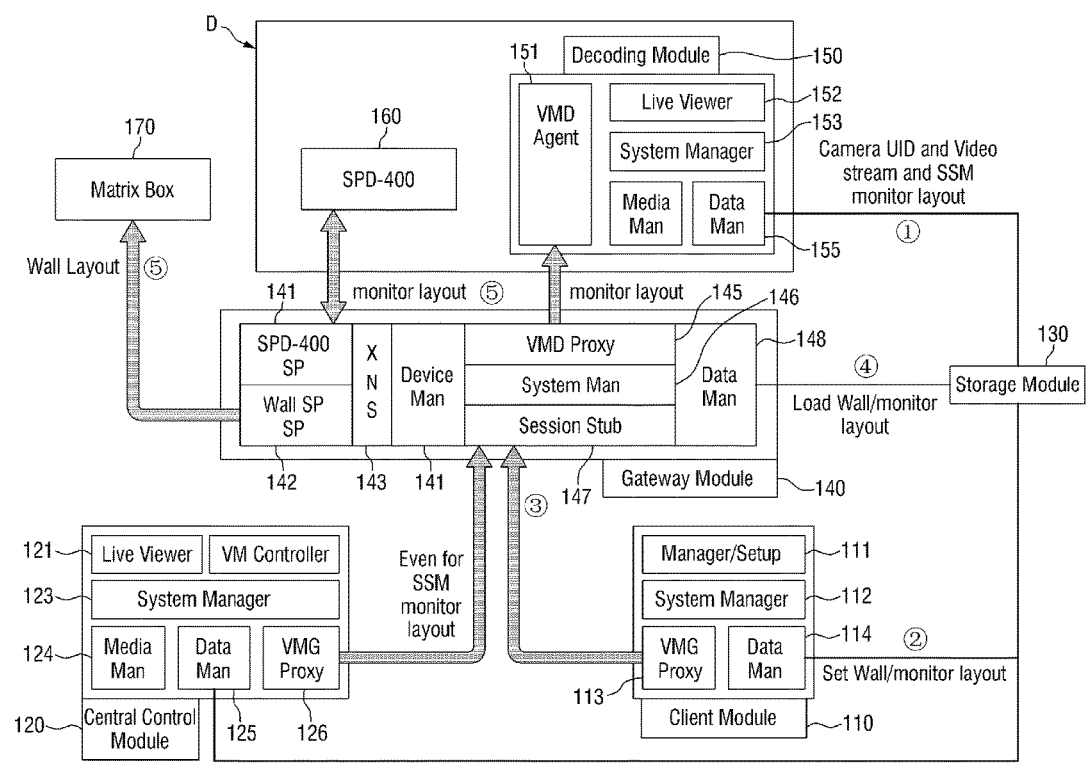
FIG. 5 is a block diagram flowchart illustrating a video wall control method according to an exemplary embodiment.

FIG. 5 is a block diagram flowchart illustrating a video wall control method according to an exemplary embodiment.

Referring to FIG. 5, in response to video control being initiated, the decoding module 150 loads a camera UID and a video stream from a video streaming server (①). In response to a layout of the video wall 5 being modified by the client module 110 or the central control module 120, a modified video wall layout may be stored in the storage module 130 (②), and the client module 110 or the central control module 120 may transmit a layout modification event to the gateway module 130, indicating that the layout of the video wall 5 has been modified (③). In response to receipt of the layout modification event, the gateway module 140 loads the modified video wall layout from the storage module 130 (④), and transmits the modified video wall layout to the decoding module 150. Then, the decoding module 150 may modify the video wall 5 according to the modified video wall layout, and may display results of the modification on the video wall 5.

The modification of the layout of the video wall 4 may be performed by software of a decoder D. Since the decoding module 150 can interwork with a maximum of 36 PCs and can provide a minimum of 25 split video streams to each monitor, whereas the network video decoder 160 can only support up to four (4) monitors, the decoding module 150 can support a maximum of 144 monitors. Since the video wall 5 and the decoding module 150 can be controlled via the gateway module 140, a change of video sources and image merge/unmerge operations may be performed by a single control process.

By adding the client module 110, the gateway module 140, and the decoding module 150 to a platform including the central control module 120, the network video decoder 160 and a matrix box 170, an interworkable platform can be built. As a result, monitor extensibility and freedom can be improved.

The central control module 120 includes a live viewer 121, which corresponds to an interface layer, and a virtual matrix (VM) controller 122. The decoding module 150 may perform the same functions as the central control module 120 by using a live viewer 152. The client module 110, the central control module 120, the gateway module 140, and the decoding module 150 may include system managers 112, 123, 146 and 153, respectively. The client module 110, the central control module 120, the gateway module 140 and the decoding module 150 may communicate with the storage module 130, which performs the functions of a server, through data managers 114, 125, 148 and 155, respectively. The client module 110 and the central control module 120 may transmit an event to the gateway module 140 via virtual matrix gateway (VMG) proxies 113 and 126, respectively. In response to receipt of an event, the gateway module 140 may receive layout information from the storage module 130, and may transmit the layout information to the decoding module 150 via a VMD proxy 145 so as to control the video wall 5. The term "virtual matrix manager (VMM)", "virtual matrix gateway (VMG)" and "virtual matrix decoder (VMD)", as used herein, may indicate the client module 110, the gateway module 140 and the decoding module 150, respectively.

According to the above exemplary embodiments, it is possible not only to provide a real-time monitoring function, but also to install and set up a video wall in consideration of properties of a place where the video wall needs to be provided. Also, it is possible to precisely detect and identify any event occurred from the video wall and notify users of results of the detection. Accordingly, context awareness of the users can be heightened.

The processes, functions, methods, and/or software described herein may be recorded, stored, or fixed in one or more computer-readable storage media that includes program instructions to be implemented by a computer to cause a processor to execute or perform the program instructions. Examples of the computer-readable storage media include magnetic media, such as hard disks, floppy disks, and magnetic tape; magnetic media such as read-only memories (ROMs), floppy disks, or hard disks, optical media such as compact discs (CDs) or digital versatile discs (DVDs), or carrier waves such as transmissions through the internet. In addition, the computer-readable storage media may be distributed among computer systems connected through a network, and computer-readable codes or program instructions may be stored and executed in a decentralized manner.

At least one of the modules represented by a block as illustrated in FIG. 2 may be embodied as various numbers of hardware, software and/or firmware structures that execute respective functions described above, according to an exemplary embodiment. For example, at least one of these modules may use a direct circuit structure, such as a memory, processing, logic, a look-up table, etc. that may execute the respective functions through controls of one or more microprocessors or other control apparatuses. Also, at least one of these modules may be specifically embodied by a program or a part of code, which contains one or more executable instructions for performing specified logic functions. Also, at least one of these modules may further include a processor such as a central processing unit (CPU) that performs the respective functions, a microprocessor, or the like While the inventive concept has been particularly shown and described with reference to exemplary embodiments thereof, it will be understood by those of ordinary skill in the art that various changes in provide and detail may be made therein without departing from the spirit and scope of the inventive concept as defined by the following claims. The exemplary embodiments should be considered in a descriptive sense only and not for purposes of limitation.

What is claimed is:

1. A video wall control system for controlling a video wall including a plurality of screens, the video wall control system comprising:
   at least one client module configured to control a layout of the video wall;
   a central control module configured to acquire camera unique identification (UID) and a video stream from a monitoring system, store the camera UID and the video stream, and control the layout of the video wall;
   a storage module configured to, in response to the layout of the video wall being modified by the client module or the central control module, store the modified video wall layout;
   a gateway module configured to receive a layout modification event indicating the modification of the layout of the video wall from the client module or the central control module and load the modified video wall layout from the storage module; and
   a decoding module configured to load the camera UID and the video stream from the central control module, receive the modified video wall layout from the gateway module, and modify the layout of the video wall based on the received modified video wall layout,
   wherein the layout of the video wall comprises a monitor mode in which each of the screens displays an image separately, a wall mode in which the screens display an image together as if they were a single screen, and a tile mode in which a single screen displays different images,
   wherein the central control module is further configured to control within a single platform, using management software, different types of video monitoring products,
   wherein the at least one client module, according to a manipulation of an end user, is further configured to select a video source, from among multiple security cameras, for each of the screens of the video wall by controlling the decoding module via the gateway module,
   wherein the screens of the video wall change simultaneously between the monitor mode, the wall mode and the tile mode, in response to the manipulation of the end user,
   wherein the central control module is further configured to acquire the camera UID and the video stream such that the video wall sequentially displays images that are respectively generated and received from the multiple security cameras installed at different locations,
   wherein the at least one client module is further configured to change the video source or the layout of the video wall independently from the central control module,
   wherein the at least one client module is further configured to transmit the layout modification event directly to the gateway module without involving the central control module, and
   wherein the video wall and the decoding module are controlled via the gateway module so that a change of video sources and image merge/unmerge operations can be performed by a single control process.

2. A method for controlling a video wall including a plurality of screens, comprising:
   in response to video control being initiated, loading camera UID and a video stream into a decoding module from a video streaming server of a central control module;
   in response to a layout of a video wall being modified by a client module or the central control module, storing the modified video wall layout;
   transmitting a layout modification event regarding the modified video wall layout from the client module or the central control module to a gateway module;
   in response to receipt of the layout modification event, loading the modified video wall layout on the gateway module from the storage module; and transmitting the loaded modified video wall layout from the gateway module to the decoding module, wherein the layout of the video wall comprises a monitor mode in which each of the screens displays an image separately, a wall mode in which the screens display an image together as if they were a single screen, and a tile mode in which a single screen displays different images, wherein the central control module controls within a single platform, using management software, different types of video monitoring products, wherein the client module, according to a manipulation of an end user, selects a video source, from among multiple security cameras, for each of the screens of the video wall by controlling the decoding module via the gateway module, wherein the screens of the video wall change simultaneously between the monitor mode, the wall mode and the tile mode, in response to the manipulation of the end user, wherein the loading camera UID and the video stream comprises loading the camera UID and the video stream such that the video wall sequentially displays images that are respectively generated and received from the multiple security cameras installed at different locations, wherein the at least one client module changes the video source or the layout of the video wall independently from the central control module, wherein the at least one client module is further configured to transmit the layout modification event directly to the gateway module without involving the central control module, and wherein the video wall and the decoding module are controlled via the gateway module, so that a change of video sources and image merge/unmerge operations can be performed by a single control process.

* * * * *